(12) United States Patent
Baker (10) Patent No.: US 9,441,838 B2
(45) Date of Patent: Sep. 13, 2016

(54) PELLET BIN INSERT AND STORAGE SYSTEM FOR SMOKER GRILLS

(71) Applicant: Edward Baker, Milton, WA (US)

(72) Inventor: Edward Baker, Milton, WA (US)

(*) Notice: Subject to any disclaimer, the term of this patent is extended or adjusted under 35 U.S.C. 154(b) by 519 days.

(21) Appl. No.: 14/083,080

(22) Filed: Nov. 18, 2013

(65) Prior Publication Data

US 2015/0136109 A1 May 21, 2015

(51) Int. Cl.
*F24B 1/08* (2006.01)
*F24B 13/04* (2006.01)
*A23B 4/052* (2006.01)

(52) U.S. Cl.
CPC ............... *F24B 1/08* (2013.01); *A23B 4/052* (2013.01); *A23B 4/0523* (2013.01); *F24B 13/04* (2013.01)

(58) Field of Classification Search
CPC .... A23B 4/044; A23B 4/052; A23B 4/0523; A23B 4/0526; A23B 4/056; F24B 13/04; F24B 1/08; F24B 1/16
USPC .................................................. 126/10, 11
See application file for complete search history.

(56) References Cited

U.S. PATENT DOCUMENTS

| 5,331,943 | A | 7/1994 | Ko |
| 5,794,810 | A | 8/1998 | Hensley |
| 5,797,333 | A | 8/1998 | Hensley |
| 5,873,356 | A | 2/1999 | Vossler et al. |
| 6,035,770 | A * | 3/2000 | Whitefield ............ A23B 4/052 99/467 |
| 7,900,553 | B1 | 3/2011 | Maurin |
| 2005/0061207 | A1 | 3/2005 | Liu |
| 2012/0199107 | A1 | 8/2012 | Riemens et al. |
| 2015/0136113 | A1 * | 5/2015 | Polter ................. A47J 37/0786 126/25 R |

* cited by examiner

*Primary Examiner* — David J Laux
(74) *Attorney, Agent, or Firm* — George A. Leone; Citadel Patent Law (57) ABSTRACT

A pellet bin insert system for a wood smoker grill includes a container with an open top, first and second parallel opposing sidewalls, a back wall, a front wall, a bottom surface and an inclined panel affixed around its perimeter to the side walls, the front wall and the bottom surface. The container includes a feeder opening in the bottom surface. A slide bar is slideably coupled to a portion of the inclined panel adjoining the bottom surface and has a bottom end slideably coupled to cover the feeder opening in a first position and to open the feeder opening when moved to a second position. The container is adapted to be inserted into a pellet hopper with the feeder hole aligned to drop pellets into a feeder mechanism when the feeder opening is uncovered.

20 Claims, 6 Drawing Sheets

PELLET BIN INSERT AND STORAGE SYSTEM FOR SMOKER GRILLS

TECHNICAL FIELD

The present invention relates to a pellet bin insert system, more particularly, the present invention is related to a pellet bin insert and storage system for smoker grills.

BACKGROUND

Texas style smoker grills that burn solid particulate fuels such as wood products (e.g., pellets, chips, etc.), are very popular due to the ability to use wood products that impart different fragrances and tastes to food. These stoves typically have a hopper or holding bin for a pellet supply or feed system that transports the pellets from the hopper to the fire chamber to be burned. Some examples of feed systems include reciprocal pushers utilizing a pusher block or flat plates welded together, rotating cups and/or augers to move the fuel. To date, it is known that wood pellets come in at least 8 types, namely, Alder, Hickory, Cherry, Oak, Apple, Pecan, Maple, and Mesquite. Each type is matched to types of foods being grilled or smoked.

While it is highly desirable to be able to easily change pellet types depending on the cook's preference for different recipes, no easy method is available with known grills. Some cooks will even cook the same dish with two different pellet types introduced at different times during the cooking process. Currently, the removal of the pellets must be done by arduously "scooping-out" any pellets left in the smoker grill main hopper in order to change out the varies types of pellets.

Although no insert systems are known to be available, smoker grills have been described in various publications. For example, US Publication US 20080085172 A1, having Publication date Apr. 10, 2008 for a "Feed system for solid particulate fuel burning stove," describes a fuel feed system for conveying particulate fuel from a hopper 30 to a firebox in a stove is provided.

In another device described in U.S. Pat. No. 6,223,737 B1, issued May 1, 2001 titled "Pellet fuel burning device," a pellet fuel burner, such as a cooking grill, has a fire box with a generally open top plane is described. A pellet burner unit is disposed in the fire box below the cooking surface. A pellet feeding device opens into the fire box and is disposed so as to feed pellets into the burner unit.

In U.S. Pat. No. 5,794,810 A issued Feb. 15, 1994 for a "Scuttle for pouring pelletized wood fuel," a scuttle device for pouring frangible, extruded wood pellets through a slot-like fill port of a hopper of a pellet-burning stove is described. The device has a wall formed to provide a pellet containment cavity, and a top cap formed with an opening for filling and emptying the cavity, wherein a fine mesh sieve is supported in the cavity and is spaced from substantially the entire inner surface of the wall to provide a collection space for receiving and retaining pellet fines, and wherein a top rim of the sieve lies closely adjacent the underside of the top cap for preventing spill-over of pellets into the collection space during pouring out of the pellets.

Unfortunately, no smoker grills or accessories are known to have solved the problem posed by having to remove by hand, individual wood pellets from the pellet hoppers of smoker grills in order change wood types for imparting different flavor characteristics to food being grilled or smoked. The present invention provides solutions for these drawbacks inherent in previous devices by providing a dual-use sealable storage container for wood pellets used in the burning process of smoker grills.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a pellet bin insert system for a wood smoker grill comprising a container having an open top, first and second parallel opposing sidewalls, a back wall, a front wall spaced apart from and parallel to the back wall, a bottom surface and an inclined panel affixed around its perimeter to the side walls, the front wall and the bottom surface. The bottom surface has a perimeter adjoining the first and second parallel opposing sidewalls, the back wall, and the inclined panel. The container includes a feeder opening in the bottom surface. A slide bar is slideably coupled to a portion of the inclined panel adjoining the bottom surface and has a bottom end slideably coupled to cover the feeder opening in a first position and to open the feeder opening when moved to a second position. The container is adapted to be inserted into a pellet hopper with the feeder hole aligned to drop pellets into a feeder mechanism when the feeder opening is uncovered.

In one aspect, the sidewalls are extended beyond the back wall to form a thermal barrier.

In another aspect, a grooved slot runs lengthwise through at least a portion of the extension of each sidewall from and perpendicular to the bottom surface.

In another aspect, a handle is affixed between the sidewalls.

In another aspect, the container comprises material selected from the group consisting of wood, metal, plastic, nylon, acrylic, composite plastics and combinations thereof.

In another aspect, the slide bar is mounted within a track.

In another aspect, the slide bar is juxtaposed between a cover and a floor comprising portions of the front wall, inclined panel and back wall to allow for slider bar action without pellets jamming the track.

In another aspect, the slide bar comprises a tapered end proximate the feeder opening.

In yet another aspect of the invention the slide bar has a length that allows the feeder opening to be fully closed when the slide bar is pushed into a closed position and fully open when the slide bar is pulled into an open position.

In yet another aspect, the slide bar comprises a handle at a top end.

In yet another aspect, the pellet bin insert system comprises a removable lid.

In yet another aspect, the removable lid includes flanged edges sized to fit snugly onto the open top to substantially seal the pellet insert bin from moisture and has a label region affixed to the top side of the lid.

In yet another aspect, a pellet usage guide is printed or affixed to the inside of the back wall having indicia and guide lines to generally indicate the amount of grilling time based on temperature setting and pellet level in the insert bin.

In yet another aspect, a plurality of insert bin containers are adapted to be stacked on a stackable cart.

In yet another aspect, a plurality of insert bin containers are adapted to be stored side-by-side on an expandable storage rack.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments for a pellet bin insert system. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a pellet bin insert system for wood smoker grills. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As can be seen from the disclosure herein, the present invention allows different types of pellet to be stored in individual bin inserts and provides a user the ability to change inserts in a hopper with the type of pellet for grilling while eliminating the need to scoop out the old pellets by hand. In addition to the storage aspect, the individual containers act as hopper inserts. These hopper inserts are sized/form-fitted to allow them to be dropped inside of the main grill's pellet hopper. The insert bin has a built in sliding door that allows the opening at the bottom to be opened and closed. When inserted into a smoker grill hopper and the sliding door is opened, it allows the pellets to drop into the auger opening at the bottom of the grill's main hopper when inserted into the main hopper. When closed the insert can be quickly removed without dropping any remaining wood pellets inside the main hopper and another insert bin can be inserted.

Figure 1:
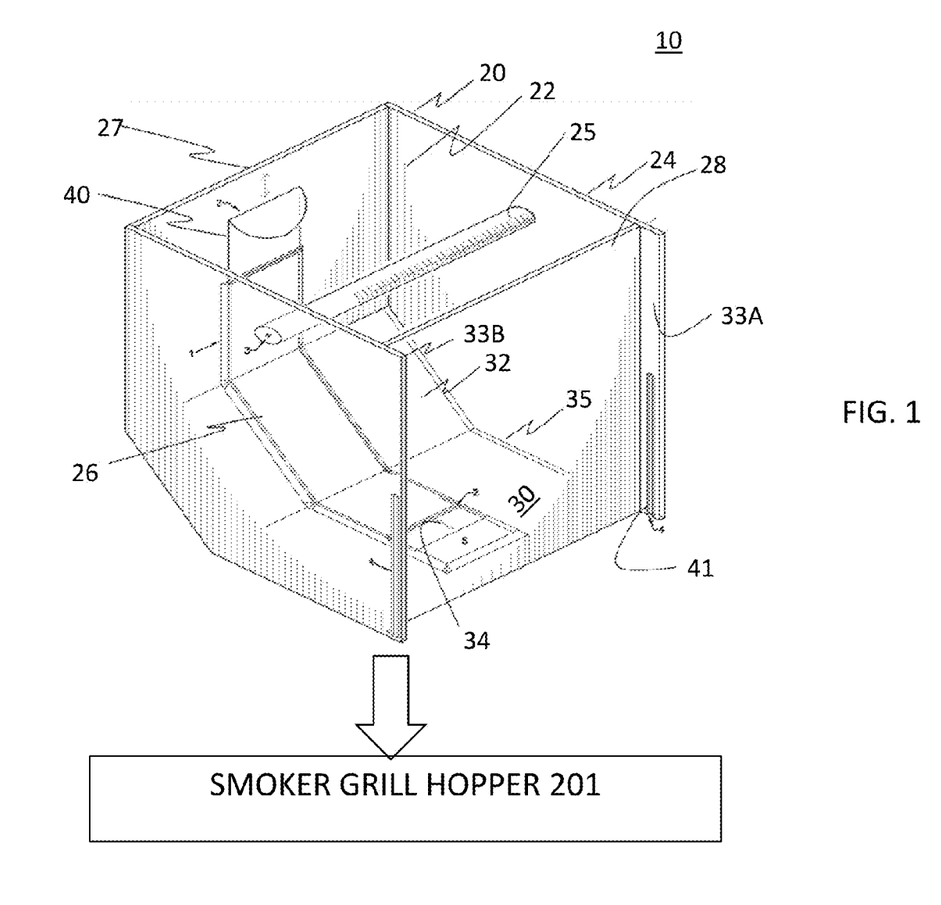
FIG. 1 schematically shows a partially cut-away perspective view of an example embodiment of a pellet bin insert.

Referring now to FIG. 1 a partially cut-away perspective view of an example embodiment of a pellet bin insert is shown. The pellet bin insert system 10 includes a container 20 having an open top 22, first and second parallel opposing sidewalls 24, 26, a front wall 27, a back wall 28 spaced apart from and parallel to the front wall 27, a bottom surface 30 and an inclined panel 32 affixed around its perimeter to the side walls, the back wall 28 and the bottom surface. The bottom surface may advantageously have perimeter edges 35 adjoining the first and second parallel opposing sidewalls 24, 26, the back wall 28, and the inclined panel 32. The container includes a feeder opening 34 in the bottom surface 30. A slide bar 40 includes a first end slideably coupled to a portion of the inclined panel adjoining the bottom surface and a second end slideably coupled to cover the feeder opening 34 in a first position and to open the feeder opening 34 when moved upward to a second position. A grooved slot 41 may be included for use with a storage rack that allows for the insert bin to be secured in place on a rack system as described further below with reference to FIG. 5 and FIG. 6.

The container may advantageously be adapted to be inserted into a smoker grill pellet hopper 201 with the feeder hole aligned to drop pellets into a feeder mechanism when the feeder opening 34 is uncovered. A handle 25 may advantageously be included and affixed between the sidewalls 24, 26 to allow a user to easily carry the bin insert. An extension of each sidewall 33A, 33B provides a thermal offset from the grill. The offset should be at least about ½ inch. It may be more or less to prevent heat buildup in the insert bin and grill hopper depending upon the material used to construct the insert bin. In some embodiments the insert bin may be comprised of wood, metal, composite plastics or the like.

In one useful embodiment, handle placement is designed to balance the bin insert when carrying it with pellets inside. An optional handle design maybe similar to a one gallon paint bucket where the handle would fold down and out of the way when filling it up with pellets.

Figures 2, 2A, 2B:
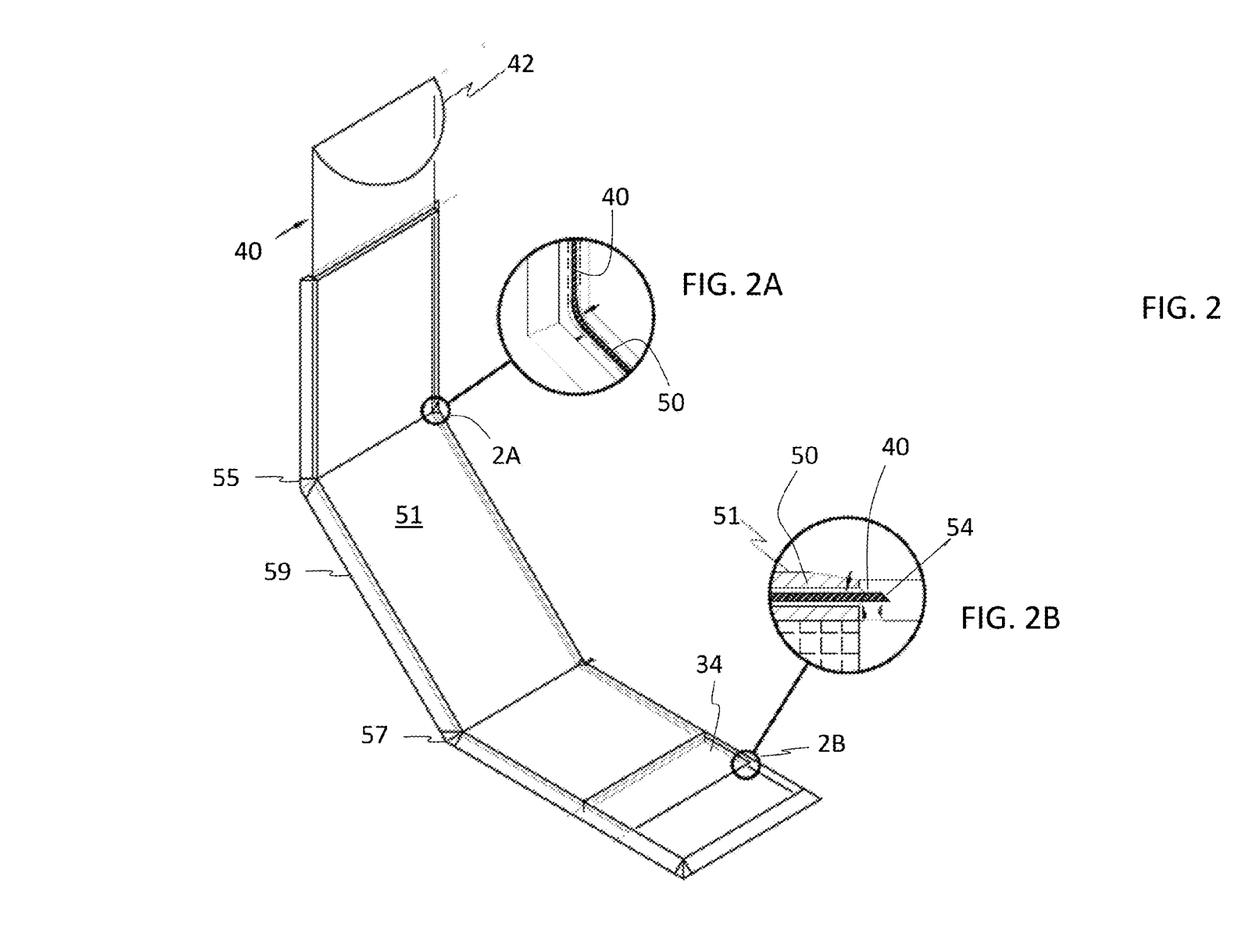
FIG. 2-FIG. 2B schematically show in more detail a perspective view of an example embodiment of a pellet bin insert system slide bar which functions as a pellet drop control.

Referring now to FIG. 2 a perspective view of an example embodiment of a pellet bin insert system slide bar which functions as a pellet drop control is schematically shown in more detail. The slide bar 40 may include a handle such as foldable flap 42 for grasping by a user when sliding the slide bar to open and close the feeder opening 34. In use, the slide bar 40 functions as a pellet drop control with push/pull operation. The slide bar is mounted within a track 50 (as best shown in FIG. 2A and FIG. 2B). The slide bar 40 may advantageously comprise a thin, flat material, such as plastic or the like, for example. The material should be selected to be strong enough to push pellet debris away from the feeder opening and flexible enough to turn smoothly and maintain its elastic limit without jamming or breaking. Other suitable materials for the slide bar include nylon, acrylics, sheet metal and the like. In one example, dual wall construction is used to contain the slide bar juxataposed between a cover 51 and a floor comprising portions of the front wall, inclined panel and back wall to allow for slider bar action without pellets jamming the track.

In use, the slide bar 40 controls the flow of pellets into the main hopper's auger by allowing variably-sized openings. It can be closed to stop the flow of pellets so that the bin insert can quickly be removed from the main hopper without spilling pellets, thus allowing for the quick change out of the various pellets types.

In one useful embodiment, the slide bar may comprise a tapered end 54 (as best shown in FIG. 2B) that functions to lift pellets and reduce jamming. The slide-bar and track assembly design must allow the slider bar to move freely inside of grooved track assembly housing. The slide-bar closes off the pellet drop opening preventing wood pellets from dropping out when the insert bin is lifted from the smoker grill pellet hopper. The length may advantageously allow enough movement so that the feeder opening can be fully closed when the slide bar is pushed into a closed position and fully open when the slide bar is pulled into an open position. In order to assure smoothness of movement the track groove may advantageously have varied thickness, especially being made wider at the bends 55, 57 than at the straight parts 59. The dual-wall construction prevents wood pellets from entering the slide track which, in turn, prevents pellets from jamming the sliding function. Additional the beveled design at the end of the slider tab is tapered in order to move/lift the pellets and create a tight seal between the opening and the back wall of the hopper.

Figure 3:
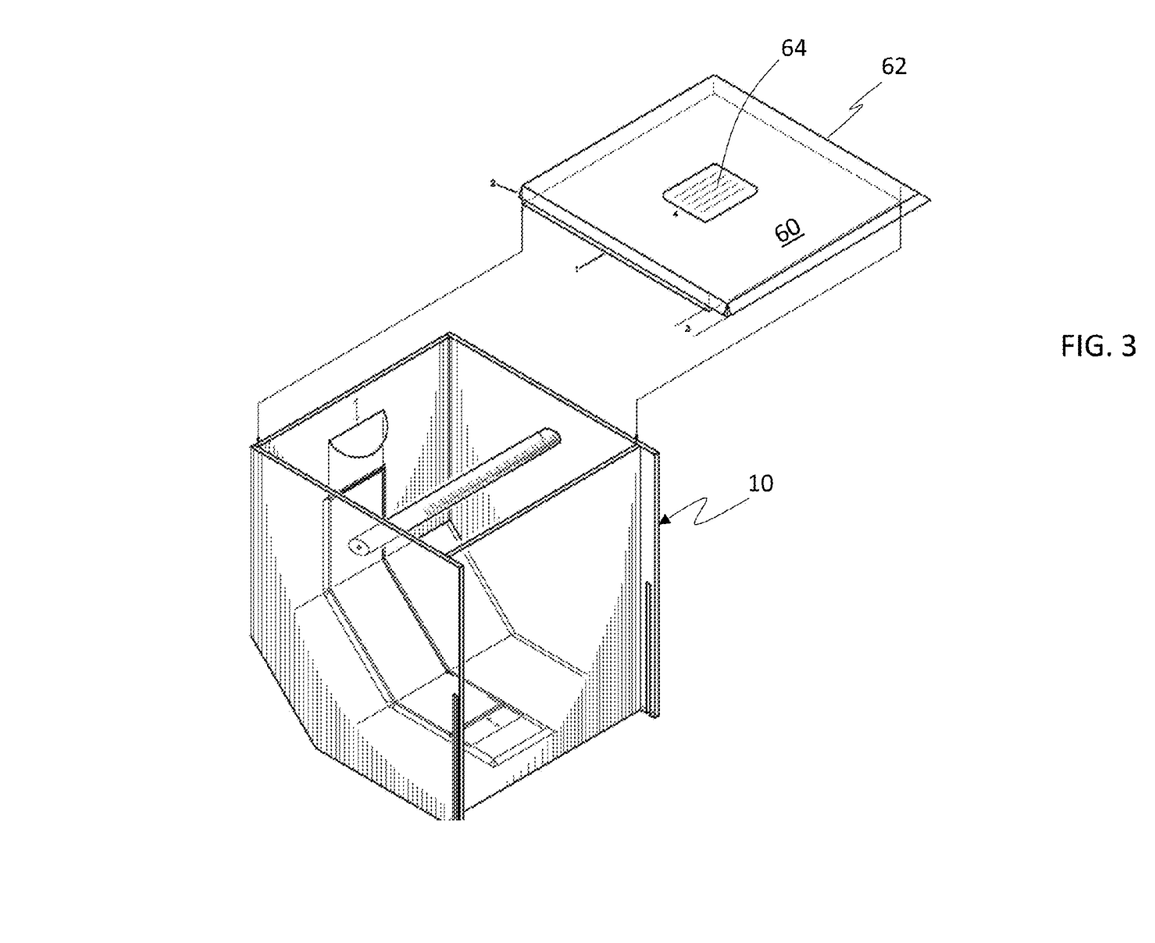
FIG. 3 schematically shows a perspective view of an example embodiment of a pellet bin insert system showing positioning of a lid.

Referring now to FIG. 3 a perspective view of an example embodiment of a pellet bin insert system showing positioning of a lid is schematically shown. The pellet bin insert system is sized to accommodate a lid 60. The lid 60 may advantageously include flanged edges 62. In one useful embodiment, the lid is sized to fit snugly onto the top opening to substantially seal the pellet insert bin from moisture. In this way pellets stored in the pellet insert can be maintained relatively dry until used. The lid may include a flange overhang to account for thermal spacing when installed in a smoker grill. An additional optional feature is a label region 64 affixed to the top side of the lid. In one useful embodiment the label region may comprise a metallic material in order to allow attachment of magnetic labels used to identify wood pellet types. In an alternative embodiment the label region may comprise a metallic frame to hold paper labels slid into the slots in order to identify wood pellet types.

Figure 4:
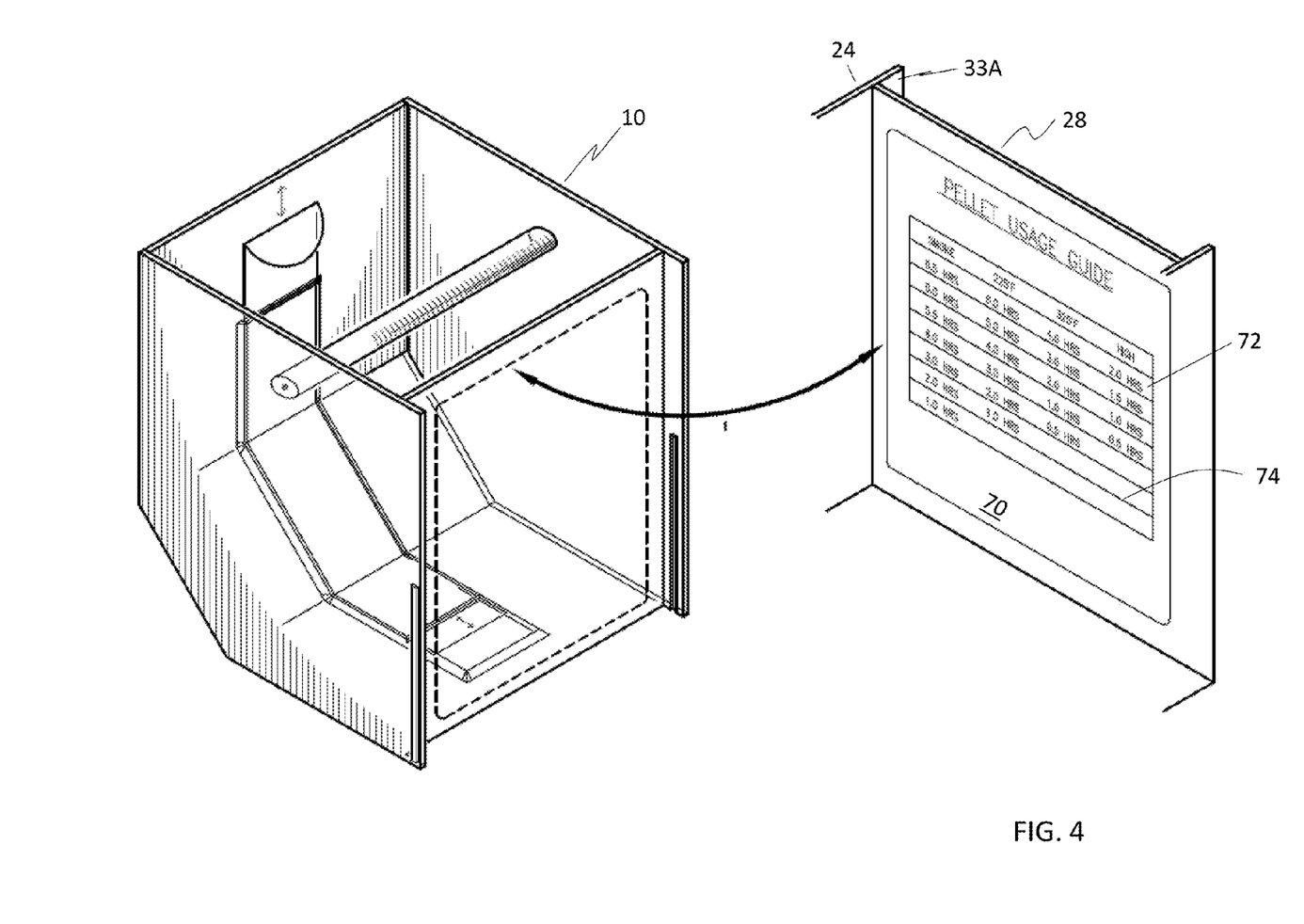
FIG. 4 schematically shows a perspective view of an example embodiment of a pellet bin insert system featuring a pellet usage guide incorporated into the system.

Referring now to FIG. 4 a perspective view of an example embodiment of a pellet bin insert system featuring a pellet usage guide incorporated into the system is schematically shown. The pellet bin insert system 10 includes a pellet usage guide 70 imprinted or otherwise affixed to the inside of the back wall 28. The pellet usage guide advantageously includes indicia 72 and guide lines 74 to generally indicate the duration of grilling time based on temperature setting and pellet level in the insert bin.

Figures 5, 6:
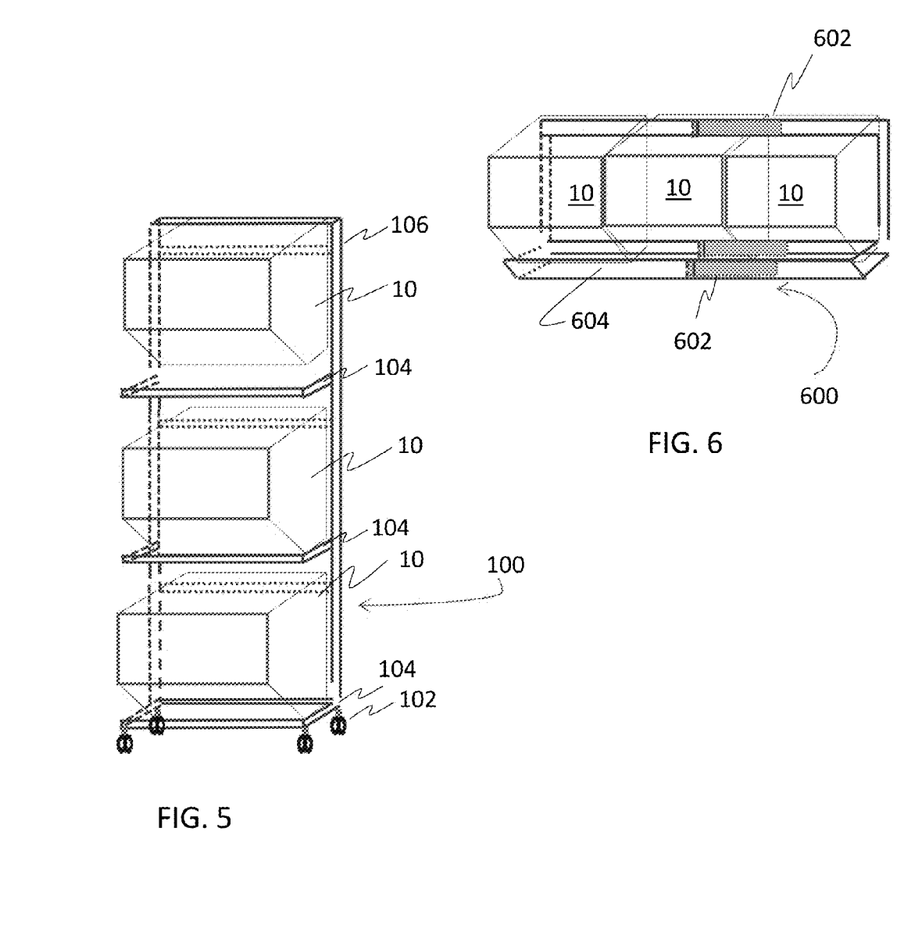
FIG. 5 schematically shows a perspective view of an example of a vertical storage scheme for a plurality of pellet bin inserts.
FIG. 6 schematically shows a perspective view of an example of a horizontal storage scheme for a plurality of pellet bin inserts.

Referring now to FIG. 5, a perspective view of an example of a vertical storage scheme for a plurality of pellet bin inserts is schematically shown. In one example embodiment, a plurality of insert bins 10 may be stacked on a stackable cart 100. The stackable cart 100 may advantageously comprise a plurality of shelves 104 affixed to a frame 106. The frame 106 is, in turn affixed to a bottom shelf having casters 102. The stackable cart may include rails (not shown) for accepting the grooved slots 41 in order to hold the insert bins securely. In this way a number of insert bins may be stored with pellets until needed.

Referring now to FIG. 6, a perspective view of an example of a horizontal storage scheme for a plurality of pellet bin inserts is schematically shown. The horizontal storage system 600 includes an expandable shelf 604 with slidable expansion elements 602 to increase or decrease the width to allow the addition of bin inserts, or to reduce the amount of shelf storage as needed. As in the case of the stackable cart, the horizontal storage system 600 may include rails (not shown) sized for accepting the grooved slots 41 in order to hold the insert bins securely.

Figure 7:
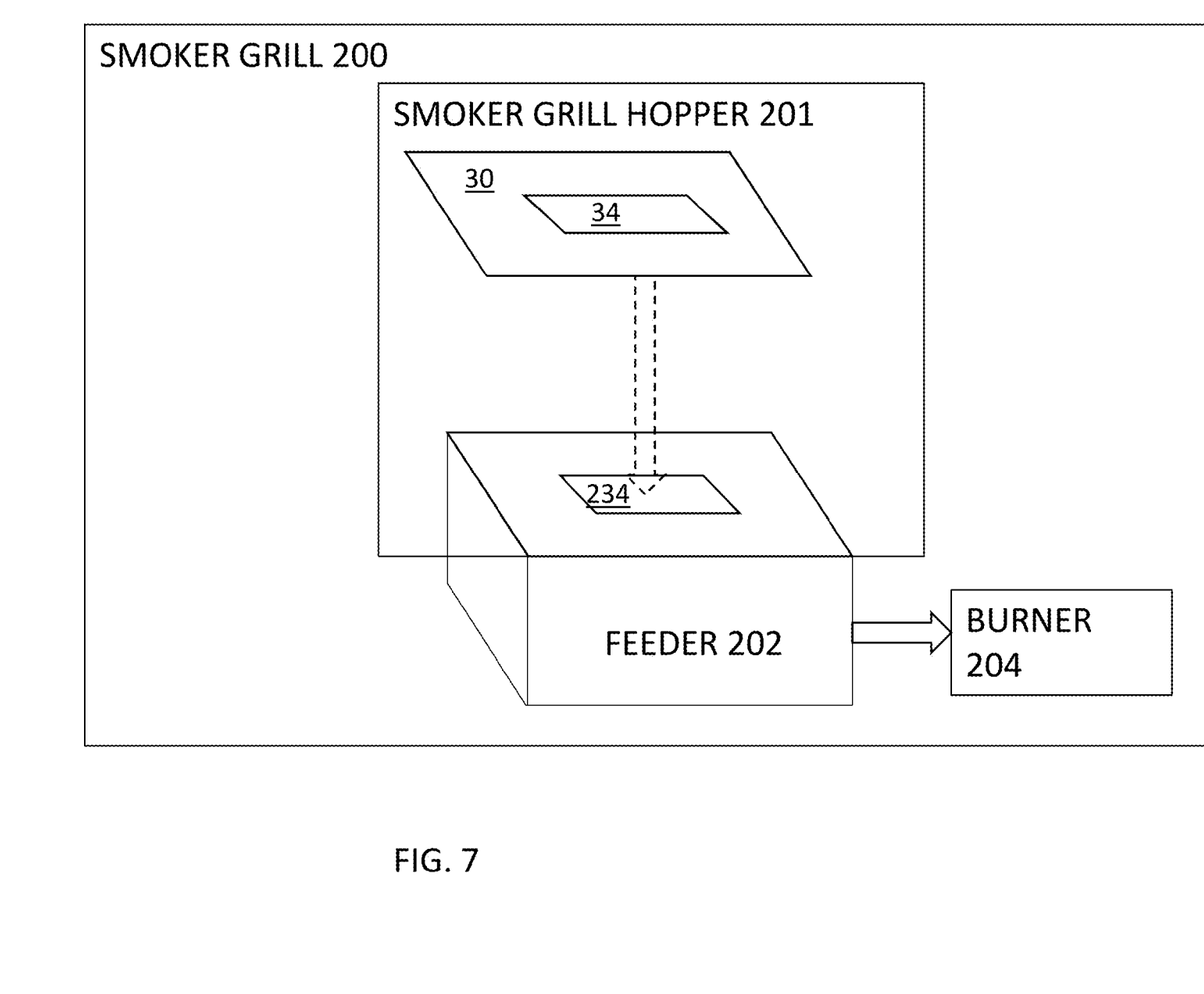
FIG. 7 schematically shows an example of a pellet bin insert being inserted with a feeder opening aligned with the feeder opening in a smoker grill hopper.

Referring now to FIG. 7, an example of a pellet bin insert being inserted to align a feeder opening with the feeder opening in a smoker grill is schematically shown. To simplify the drawing for better understanding only the relevant components of the pellet insert system and smoker grill are shown. Illustrated here is the alignment between the pellet bin insert and the feeder hole 202 of the smoker grill. The bottom surface 30 of the pellet bin insert is shown being installed in the hopper 201 of a smoker grill 200, where the hopper 201 includes a feeder hole 234 located to feed pellets into a feeder 202, usually an auger. The feeder 202 pushes pellets into a burner 204 where they are ignited. The feeder hole 34 is advantageously located to align with the opening of the smoker grill feeder so that pellets will fall into the smoker grill feeder when the pellet bin insert has been opened using the slide bar.

Having described the invention above, it is now considered useful to the understanding of the invention to describe further aspects of the construction details of one example embodiment. The bin insert system can be made of various materials specific to the marketing/consumer. For example, wooden versions could be made and offered as an "Executive" line meaning, made of unique woods and finished with various stains and lacquers. Other embodiments may comprise plastic as made with conventional processes such as forming plastic foams, using injection molding or the like.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A pellet bin insert system for a wood smoker grill comprising:

a container having an open top, first and second parallel opposing sidewalls, a back wall, a front wall spaced apart from and parallel to the back wall, a bottom surface and an inclined panel affixed around its perimeter to the side walls, the front wall and the bottom surface;

wherein the bottom surface has a perimeter adjoining the first and second parallel opposing sidewalls, the back wall, and the inclined panel;

where the container includes a feeder opening in the bottom surface;

a slide bar having a first end slideably coupled to a portion of the inclined panel adjoining the bottom surface and having a second end slideably coupled to cover the feeder opening in a first position and to open the feeder opening when moved to a second position; and wherein the container is adapted to be inserted into a pellet hopper with the feeder hole aligned to drop pellets into a feeder mechanism when the feeder opening is uncovered.

2. The pellet bin insert system of claim 1 wherein the sidewalls are extended beyond the back wall to form a thermal barrier.

3. The pellet bin insert system of claim 2 further comprising a grooved slot running lengthwise through at least a portion of the extension of each sidewall from and perpendicular to the bottom surface.

4. The pellet bin insert system of claim 1 further comprising a handle affixed between the sidewalls.

5. The pellet bin insert system of claim 1 wherein the container comprises material selected from the group consisting of wood, metal, plastic, nylon, acrylic, composite plastics and combinations thereof.

6. The pellet bin insert system of claim 1 wherein the slide bar is mounted within a track.

7. The pellet bin insert system of claim 1 wherein the slide bar is juxtaposed between a cover and a floor comprising portions of the front wall, inclined panel and back wall to allow for smooth sliding action.

8. The pellet bin insert system of claim 1 wherein the slide bar comprises a tapered end proximate the feeder opening.

9. The pellet bin insert system of claim 1 wherein the slide bar comprises a handle at a top end.

10. The pellet bin insert system of claim 1 wherein the slide bar has a length that allows the feeder opening can be fully closed when the slide bar is pushed into a closed position and fully open when the slide bar is pulled into an open position.

11. The pellet bin insert system of claim 1 further comprising a removable lid.

12. The pellet bin insert system of claim 11 wherein the removable lid includes flanged edges sized to fit snugly onto the open top to substantially seal the pellet insert bin from moisture.

13. The pellet bin insert system of claim 11 wherein the removable lid comprises a label region affixed to the top side of the lid.

14. The pellet bin insert system of claim 1 further comprising a pellet usage guide printed or affixed to the inside of the back wall.

15. The pellet bin insert system of claim 14 wherein the pellet usage guide includes indicia and guide lines to generally indicate the amount of grilling time based on temperature setting and pellet level in the insert bin.

16. The pellet bin insert system of claim 1 wherein a plurality of insert bin containers are adapted to be stacked on a stackable cart.

17. The pellet bin insert system of claim 1 wherein a plurality of insert bin containers are adapted to be stored side-by-side on an expandable storage rack.

18. A pellet bin insert system for a wood smoker grill comprising:

a container having an open top, first and second parallel opposing sidewalls, a back wall, a front wall spaced apart from and parallel to the back wall, a bottom surface and an inclined panel affixed around its perimeter to the side walls, the front wall and the bottom surface;

wherein the bottom surface has a perimeter adjoining the first and second parallel opposing sidewalls, the back wall, and the inclined panel;

where the container includes a feeder opening in the bottom surface;

wherein the sidewalls are extended beyond the back wall to form a thermal barrier and have a grooved slot running lengthwise through the extension of each sidewall from and perpendicular to the bottom surface;

a handle affixed between the sidewalls;

a slide bar having a first end slideably coupled to a portion of the inclined panel adjoining the bottom surface and having a second end slideably coupled to cover the feeder opening in a first position and to open the feeder opening when moved to a second position;

wherein the slide bar comprises a tapered end proximate the feeder opening; and wherein the container is adapted to be inserted into a pellet hopper with the feeder hole aligned to drop pellets into a feeder mechanism when the feeder opening is uncovered.

19. A pellet bin insert system for a wood smoker grill comprising:

a container having an open top, first and second parallel opposing sidewalls, a back wall, a front wall spaced apart from and parallel to the back wall, a bottom surface and an inclined panel affixed around its perimeter to the side walls, the front wall and the bottom surface;

wherein the bottom surface has a perimeter adjoining the first and second parallel opposing sidewalls, the back wall, and the inclined panel;

where the container includes a feeder opening in the bottom surface;

wherein the sidewalls are extended beyond the back wall to form a thermal barrier and have a grooved slot running lengthwise through the extension of each sidewall from and perpendicular to the bottom surface;

a handle affixed between the sidewalls;

a slide bar having a first end slideably coupled by a track to a portion of the inclined panel adjoining the bottom surface and having a second end slideably coupled to cover the feeder opening in a first position and to open the feeder opening when moved to a second position;

wherein the slide bar has a tapered end proximate the feeder opening;

wherein the container is adapted to be inserted into a pellet hopper with the feeder hole aligned to drop pellets into a feeder mechanism when the feeder opening is uncovered;

a removable lid including flanged edges sized to fit snugly onto the open top to substantially seal the pellet insert bin from moisture, wherein the removable lid further includes a label region affixed to the top side of the lid; and a pellet usage guide printed or affixed to the inside of the back wall.

20. The pellet bin insert system of claim 19 wherein a plurality of insert bin containers are adapted to be stored side-by-side on an expandable storage rack.

\* \* \* \* \*